United States Patent
Park et al.

(10) Patent No.: US 10,140,755 B2
(45) Date of Patent: Nov. 27, 2018

(54) THREE-DIMENSIONAL (3D) RENDERING METHOD AND APPARATUS

(71) Applicant: Samsung Electronics Co., Ltd., Suwon-si (KR)

(72) Inventors: Seungin Park, Yongin-si (KR); Minsu Ahn, Seoul (KR); Minjung Son, Suwon-si (KR); Hyong Euk Lee, Suwon-si (KR); Inwoo Ha, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 24 days.

(21) Appl. No.: 15/076,817

(22) Filed: Mar. 22, 2016

(65) Prior Publication Data

US 2017/0032567 A1 Feb. 2, 2017

(30) Foreign Application Priority Data

Jul. 28, 2015 (KR) .................. 10-2015-0106829

(51) Int. Cl.
| | | |
|---|---|---|
| *G06T 15/80* | (2011.01) | |
| *G06T 15/00* | (2011.01) | |
| *G06T 17/20* | (2006.01) | |

(52) U.S. Cl.
CPC ............ *G06T 15/80* (2013.01); *G06T 15/005* (2013.01)

(58) Field of Classification Search
CPC ....... G06T 17/20; G06T 17/205; G06T 15/04; G06T 11/40; G06T 15/005; G06T 15/506; G06T 15/50; G06T 15/60; G06T 15/80; G06T 15/06
See application file for complete search history.

(56) References Cited

U.S. PATENT DOCUMENTS

| | | | |
|---|---|---|---|
| 5,444,838 A * | 8/1995 | Kommrusch | ........... G06T 17/00 345/421 |
| 7,038,685 B1 | 5/2006 | Lindholm | |
| 7,327,369 B2 | 2/2008 | Morein et al. | |
| 8,355,022 B2 | 1/2013 | Hoffman et al. | |
| 9,311,737 B1 * | 4/2016 | Wrenninge | ............. G06T 13/20 |
| 2005/0012745 A1 * | 1/2005 | Kondo | .................. G06T 3/0062 345/427 |
| 2008/0235316 A1 | 9/2008 | Du et al. | |
| 2011/0080415 A1 * | 4/2011 | Duluk, Jr. | ................ G06T 1/20 345/506 |

(Continued)

FOREIGN PATENT DOCUMENTS

| | | |
|---|---|---|
| JP | 2008-257127 A | 10/2008 |
| JP | 2008-257431 A | 10/2008 |
| KR | 10-2013-0123645 A | 11/2013 |

*Primary Examiner* — Todd Buttram
(74) *Attorney, Agent, or Firm* — NSIP Law

(57) ABSTRACT

A three-dimensional (3D) rendering method and apparatus is disclosed. The 3D rendering apparatus determines a vertex for a first shading from among vertices of a 3D model based on characteristic information of the 3D model, performs the first shading on the determined vertex, determines a pixel area for a second shading based on reference information indicating whether the first shading is applied to at least one vertex comprising the pixel area, performs the second shading on the determined pixel area, and generates a rendered image based on the first shading and the second shading.

24 Claims, 6 Drawing Sheets

(56) References Cited

U.S. PATENT DOCUMENTS

| | | | | |
|---|---|---|---|---|
| 2012/0229460 A1* | 9/2012 | Fortin | ............ | G06T 1/20 |
| | | | | 345/419 |
| 2013/0176313 A1* | 7/2013 | Gautron | ............ | G06T 15/50 |
| | | | | 345/426 |
| 2014/0028673 A1* | 1/2014 | Gregson | ............ | G06T 17/20 |
| | | | | 345/420 |
| 2015/0097857 A1* | 4/2015 | Akenine-Moller | ...... | G06T 11/40 |
| | | | | 345/619 |
| 2015/0348283 A1* | 12/2015 | Clarberg | ............ | G06T 1/20 |
| | | | | 345/420 |
| 2016/0042560 A1* | 2/2016 | Chang | ............ | G06T 15/80 |
| | | | | 345/426 |
| 2017/0004647 A1* | 1/2017 | Grossman | ............ | G06T 1/60 |

\* cited by examiner

THREE-DIMENSIONAL (3D) RENDERING METHOD AND APPARATUS

CROSS-REFERENCE TO RELATED APPLICATION(S)

This application claims the benefit under 35 USC § 119(a) of Korean Patent Application No. 10-2015-0106829, filed on Jul. 28, 2015, in the Korean Intellectual Property Office, the entire disclosure of which is incorporated herein by reference for all purposes.

BACKGROUND

1. Field

The following description relates to three-dimensional (3D) computer graphics technology.

2. Description of Related Art

Three-dimensional (3D) computer graphics refer to computer graphics including three-dimensionally expressing a model using geometric data stored in a computer and processing and outputting the three-dimensionally expressed model as a 2D resulting product. The geometric data of the model may include information on a location of each point forming the model. In the 3D computer graphics, 3D rendering refers to a process of transforming a 3D model to a 2D image, which includes calculating a light flow to obtain a photorealistic image or performing non-photorealistic rendering (NPR) to obtain a resulting product. The 3D rendering refers to a process of determining a set of coordinates and a color of a pixel to be output to a display using points, for example, vertices, forming a model and information about a relationship among the points.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a three-dimensional (3D) rendering method including determining a vertex for a first shading from among vertices of a 3D model based on characteristic information of the 3D model, performing the first shading on the determined vertex, determining a pixel area for a second shading based on reference information, performing the second shading on the determined pixel area, and generating a rendered image based on the first shading and the second shading.

The determining of the vertex for the first shading may include determining the vertex based on a length of an edge between a vertex and a neighboring vertex of the 3D model.

The determining of the vertex for the first shading may include determining the vertex based on an area of a polygon formed with the vertex.

The method may include dividing a surface of the 3D model into a plurality of areas in response to a determination of an applicability of a surface subdivision to the 3D model, and the determining of the vertex for the first shading comprises determining the vertex based on the divided the 3D model.

The dividing of the surface of the 3D model may include adding at least one vertex to the surface of the 3D model.

The reference information may indicate whether the first shading is applied to at least one vertex comprising the pixel area.

The determining of the pixel area for the second shading may include determining the pixel area based on the reference information and a threshold value.

The determining of the vertex may include determining the vertex to which the first shading is to be applied based on at least one of information about a vertex density of the 3D model, information about an area of a polygon formed by vertices of the 3D model, information about a distance among vertices to be projected to a screen space, information about an area of a polygon to be projected to the screen space, or information about a distance between a vertex and a virtual light source.

The characteristic information of the 3D model may be determined based on at least one of vertex information of the 3D model, location information of a virtual camera, direction information of the virtual camera, location information of a virtual light source, or direction information of the virtual light source.

The first shading may be determined in a vertex unit of the 3D model, and the second shading may be determined in a pixel unit of an image frame in which the 3D model is expressed.

The determining of the pixel area for the second shading may include determining the pixel area based on a speed at which rendering is performed on the 3D model and the reference information.

In another general aspect, there is provided a 3D rendering apparatus including a determiner configured to determine a vertex for a first shading from among vertices of a 3D model based on characteristic information of the 3D model, a first shader configured to perform the first shading on the determined vertex, a second shader configured to determine a pixel area to apply a second shading based on reference information, and to perform the second shading on the determined pixel area, and a rendered image generator configured to generate a rendered image based on the first shading and the second shading.

The first shader may be configured to allocate, to each vertex of the 3D model to be projected to a screen space, a vertex attribute value indicating whether the first shading is performed.

The determiner may include a divider configured to determine whether a surface subdivision is applicable to the 3D model, and may divide a surface of the 3D model into a plurality of areas in response to the applicability of the surface subdivision.

The first shading may be determined in a vertex unit of the 3D model, and the second shading may be determined in a pixel unit of an image frame in which the 3D model is expressed.

The determiner may be configured to determine the vertex for the first shading, in response to a distance between the vertex and the virtual light source is less than a threshold value.

In accordance with another aspect, there is provided a 3D rendering apparatus including a determiner configured to determine whether to apply a first shading or a second shading to a current image frame, a first shader configured to perform the first shading on the current image frame, in response to the first shading being determined, a second shader configured to perform the second shading on the current image frame, in response to the second shading being determined, and a rendered image generator configured to generate a rendered image for the current image frame based on any one or any combination of the first shading or the second shading.

The determiner may be configured to determine the first shading type or the second shading based on at least one of vertex information of the 3D model or a speed at which rendering is performed on the 3D model.

Other features and aspects will be apparent from the following detailed description, the drawings, and the claims.

Figure 1:
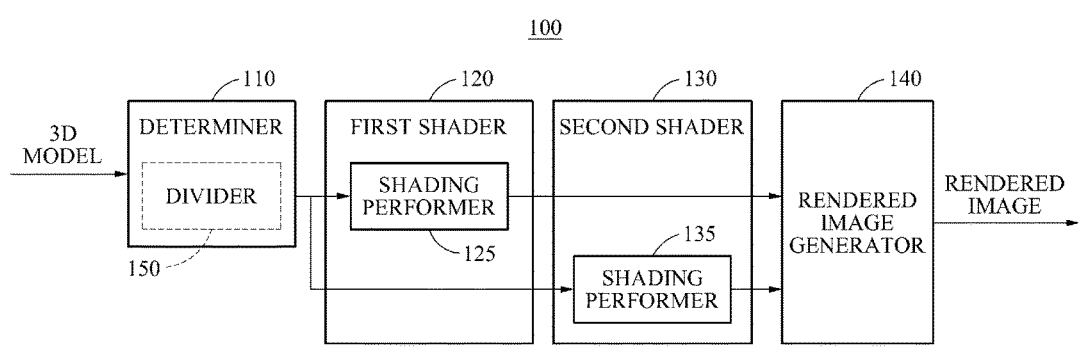
FIG. 1 is a diagram illustrating an example of a configuration of a three-dimensional (3D) rendering apparatus.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

The terminology used herein is for the purpose of describing particular examples only and is not to be limiting of the examples. As used herein, the singular forms "a", "an", and "the" are intended to include the plural forms as well, unless the context clearly indicates otherwise. It will be further understood that the terms "include/comprise" and/or "have" when used in this specification, specify the presence of stated features, integers, steps, operations, elements, components, and/or combinations thereof, but do not preclude the presence or addition of one or more other features, numbers, steps, operations, elements, components, and/or groups thereof.

When describing the examples with reference to the accompanying drawings, like reference numerals refer to like constituent elements and a repeated description related thereto will be omitted. When it is determined detailed description related to a related known function or configuration they may make the purpose of the examples unnecessarily ambiguous in describing the examples, the detailed description will be omitted here.

FIG. 1 is a diagram illustrating an example of a configuration of a three-dimensional (3D) rendering apparatus 100. The 3D rendering apparatus 100 may performing rendering, for example, 3D rendering, on an input 3D model to output a rendered image, which is a two-dimensional (2D) image, obtained by. The 3D rendering apparatus 100 may determine information of pixels to be included in the rendered image based on a location of a virtual light source and a location of a virtual camera in a virtual space in which the 3D model is to be expressed. The virtual light source may emit light in a given direction in the virtual space, and the virtual camera may determine a viewpoint of viewing the 3D model.

In an example, the 3D rendering apparatus 100 may perform the rendering by applying different types of shading to a single image frame. For example, the 3D rendering apparatus 100 may perform a vertex-based first shading on one area of the image frame, and perform a pixel-based second shading on another area of the image frame. A vertex indicates a point forming a 3D model, and shading refers to a process of calculating a color of a surface of a 3D model based on a direction and a location of a virtual light source to render the 3D model.

Referring to FIG. 1, the 3D rendering apparatus 100 includes a determiner 110, a first shader 120, a second shader 130, and a rendered image generator 140.

When a 3D model is input, the determiner 110 determines at least one vertex for applying the first shading among vertices of the 3D model to be projected to a screen space. The vertices of the 3D model projected to the screen space indicate vertices to be expressed in a rendered image among all vertices that form the 3D model.

The determiner 110 uses characteristic information of the 3D model to determine the vertex to which the first shading is to be applied. The characteristic information of the 3D model includes geometrical characteristic information of the 3D model. The characteristic information of the 3D model may be determined based on at least one of vertex information of the 3D model, location information of a virtual camera, direction information of the virtual camera, location information of a virtual light source, and direction information of the virtual light source. The vertex information of the 3D model includes information about attributes of a vertex, for example, 3D coordinates, a color, and a normal of the vertex.

In an example, the determiner 110 may determine the vertex to which the first shading is to be applied using at least one of information about a vertex density of the 3D model, information about an area of a polygon including vertices of the 3D model, information about a distance among the vertices to be projected to the screen space, information about an area of a polygon to be projected to the screen space, and information about a distance between a vertex and the virtual light source. Here, a polygon indicates a single surface unit including three vertices in a 3D model. Some examples in which the determiner 110 determines the vertex to which the first shading is to be applied using each set of the above-mentioned information are described below. The examples described are non-exhaustive examples and are provided for better understanding, and may not be construed as limiting a scope of the disclosure.

In an example, the determiner 110 uses the information about a vertex density of the 3D model to determine the vertex to which the first shading is to be applied.

The determiner 110 may determine vertices to which the first shading is to be applied from vertices present in an area having a high vertex density. The information about a vertex density indicates information about a distance among vertices. For example, a high vertex density indicates a relatively short distance among the vertices, and a low vertex density indicates a relatively long distance among the vertices. The determiner 110 may determine a vertex to which the first shading is to be applied based on an edge length, which indicates a distance between a vertex and neighboring vertices. For example, when edge lengths formed by a vertex are less than a threshold value, the determiner 110 may identify the vertex for applying the first shading.

In another example, the determiner 110 uses the information about an area of a polygon to determine the vertex to which the first shading is to be applied.

The determiner 110 may compare areas of polygons of the 3D model to a threshold value. When an area of a polygon is less than the threshold value, the determiner 110 may determine vertices forming the polygon to be vertices to which the first shading is to be applied.

In another example, the determiner 110 uses the information about a distance among the vertices to be projected to the screen space to determine the vertex to which the first shading is to be applied is described below.

The determiner 110 may determine a vertex to which the first shading is to be applied based on an edge length between a vertex and a neighboring vertex of the 3D model to be projected to the screen space. For example, when the longest edge length between a vertex and neighboring vertices to be projected to the screen space is less than a threshold value, the determiner 110 may determine the vertex to be a vertex to which the first shading is to be applied.

In another example, the determiner 110 uses the information of an area of a polygon to be projected to the screen space to determine the vertex to which the first shading is to be applied.

The determiner 110 may compare areas of polygons of the 3D model to be projected to the screen space to a threshold value. When an area of a polygon to be projected to the screen space is less than the threshold value, the determiner 110 may determine vertices forming the polygon to be vertices to which the first shading is to be applied.

In another example, the determiner 110 uses the information about a distance between a vertex and a virtual light source to determine the vertex to which the first shading is to be applied.

The determiner 110 may calculate a distance between a vertex of the 3D model to be projected to the screen space and the virtual light source. When the calculated distance is less than a threshold value, the determiner 110 may determine the vertex to be a vertex to which the first shading is to be applied.

In another example, the determiner 110 may determine a vertex to which the first shading is to be applied based on the characteristic information of the 3D model and on a 3D model rendering speed. The 3D model rendering speed is a speed at which rendering is performed on the 3D model, for example, a frame per second (FPS). For example, when the 3D model rendering speed is less than a reference speed, the determiner 110 may increase a proportion of vertices to which the first shading is to be applied among vertices of the 3D model to be projected to the screen space. When the 3D model rendering speed is greater than the reference speed, the determiner 110 may decrease the proportion of the vertices to which the first shading is to be applied among the vertices of the 3D model to be projected to the screen space. When the 3D model rendering speed is determined to be sufficiently fast, the determiner 110 may determine no vertex exists to which the first shading is to be applied, In this example, only the second shading is performed without the first shading to obtain a high-definition rendered image irrespective of a processing complexity.

In another example, the determiner 110 may include a divider 150. The divider 150 determines whether a surface subdivision is applicable to the 3D model. When the surface subdivision is to be applied, the divider 150 may divide a surface of the 3D model into a plurality of areas. For example, when an edge length between vertices to be projected to the screen space is longer than the threshold value, and it is determined that the first shading is not to be applied to the vertices, the divider 150 may determine a possibility of generating a new vertex in a polygon based on the existing vertices. When new vertex are to be generated, the divider 150 may divide the polygon into a plurality of areas by adding the new vertex to the polygon. The determiner 110 may determine a vertex to which the first shading is to be applied based on vertices of the 3D model restructured through the surface subdivision.

A shading performer 125, which is included in the first shader 120, determines a first shading effect by performing the first shading on the vertex determined by the determiner 110. The shading performer 125 performs interpolation based on vertex shading values determined through the first shading, and transfers a result of the interpolation to the second shader 130. A shading performer 135, which is included in the second shader 130, determines a pixel area to which the second shading is to be applied based on reference information indicating whether the first shading is applied. The shading performer 135 determines a second shading effect by performing the second shading on the determined pixel area. The first shading may have a relatively faster processing speed than the second shading. An image quality of an image rendered through the second shading may be more desirable than an image quality of an image rendered through the first shading.

Information about vertices on which the first shading is not performed among the vertices of the 3D model projected to the screen space may be transferred to the second shader 130 after being rendered through the first shader 120. The first shading effect determined by the first shader 120 may be transferred to the rendered image generator 140 after being rendered through the second shader 130.

In an example, the first shader 120 and the second shader 130 may correspond to a vertex shader and a pixel shader, respectively, in a rendering pipeline of 3D computer graphics. For example, the first shader 120 may perform a per-vertex shading (PVS) to determine a vertex unit-based shading effect of the 3D model, and the second shader 130 may perform a per-pixel shading (PPS) to determine a pixel unit-based shading effect of an image frame in which the 3D model is expressed.

The PVS method includes obtaining a shading value by calculating a shading equation for each vertex of the 3D model, interpolating the obtained shading values of vertices, and determining pixel values of a finally rendered image. The PPS method includes calculating a shading equation for each pixel of an image frame that is to be rendered, and determining pixel values of the rendered image. In PVS, an operation processing speed and an image quality may vary depending on the number of vertices forming the 3D model. For example, in response to a less number of vertices forming the surface of the 3D model, the rendering speed may be faster despite a less detailed expression of the 3D model. In general, the PPS including calculating the shading effect in a pixel unit may generate a rendered image of a more desirable image quality in comparison to the PVS. However, in response to an increase in a resolution of an image to be rendered, a rendering speed may become slower due to an excessive amount of operation.

The first shader 120 determines a vertex attribute value indicating whether the first shading is performed on the vertices of the 3D model to be projected to the screen space. The reference information may be determined based on the vertex attribute value. For example, the first shader 120 may allocate, to a vertex on which the first shading is performed, a flag value of "1" indicating that the first shading is performed. Also, the first shader 120 may allocate a flag value of "0" to a vertex on which the first shading is not performed. When such allocated flag information is transferred to the second shader 130, the reference information may be determined with respect to all pixels of an image frame through the interpolation. Interpolated values of the set flag values may be allocated to pixels of the image frame to which the flag values are not allocated, so that the pixels have median values between 0 and 1. For example, the second shader 130 may perform the second shading on pixels, among the pixels included in the image frame, having reference information less than a threshold value.

In another example, the second shader 130 may determine a pixel area to which the second shading is to be performed based on a 3D model rendering speed. For example, when the rendering speed is faster than the reference speed, the second shader 130 may expand the pixel area to which the second shading is to be applied. When the rendering speed is slower than the reference speed, the second shader 130 may reduce the pixel area to which the second shading is to be applied.

The rendered image generator 140 generates a rendered image obtained by rendering the 3D model based on the first shading effect determined by the first shader 120 and the second shading effect determined by the second shader 130.

In an example, the 3D rendering apparatus 100 may perform rendering at a high speed while minimizing a degradation of an image quality of the rendered image using a combination of the first shading and the second shading, which are of different types in a single image frame based on a characteristic of the 3D model or the rendering speed. For example, the 3D rendering apparatus 100 may apply the first shading, which may be available for a faster processing, to an area in which a degradation of an image quality is not expected to occur in the single image frame based on the characteristic of the 3D model. In addition, the 3D rendering apparatus 100 may apply the second shading, which may be available for a more desirable image quality, to an area in which a degradation of an image quality is expected to occur in the single image frame. Thus, the 3D rendering apparatus 100 may perform the rendering at a high speed while minimizing a degradation of an image quality.

In another example, the 3D rendering apparatus 100 may determine whether the first shading is to be applied or the second shading is to be applied for each image frame. The determiner 110 may determine a shading type to be applied to a current image frame between the first shading and the second shading based on the vertex information of the 3D model or the 3D model rendering speed. For example, when the rendering speed is slow, the determiner 110 may determine the first shading, which calculates a shading effect in a vertex unit for a corresponding image frame. When the rendering speed is sufficiently fast, the determiner 110 may determine the second shading, which calculates a shading effect in a pixel unit, for a corresponding image frame. When the shading type is determined to be the first shading, the first shader 120 may determine the first shading effect by applying the first shading to the current image frame. When the shading type is determined to be the second shading, the second shader 130 may determine the second shading effect by applying the second shading to the current image frame. The rendered image generator 140 may generate a rendered image for the current image frame based on the first shading effect or the second shading effect. The 3D rendering apparatus 100 may perform 3D rendering at a high speed without degradation of an image quality by selectively using the different types of shading based on a rendering effect for each image frame.

Figure 2:
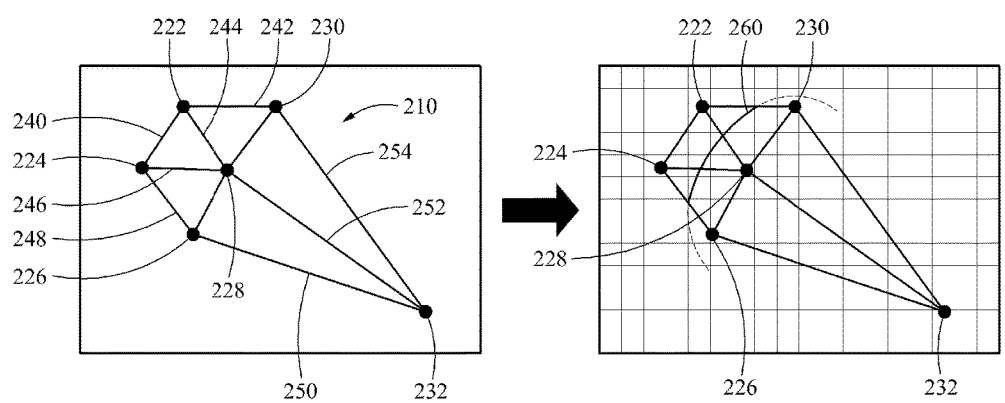
FIG. 2 is a diagram illustrating an example of a process of performing a first shading and a second shading.

FIG. 2 illustrates an example of a process of performing a first shading and a second shading.

Referring to FIG. 2, a 3D model 210 includes six vertices, for example a vertex 222, a vertex 224, a vertex 226, a vertex 228, a vertex 230, and a vertex 232, to be projected to a screen space. A 3D rendering apparatus determines a vertex to which a first shading is to be applied among the vertices 222, 224, 226, 228, 230, and 232 of the 3D model 210 projected to the screen space. For example, the 3D rendering apparatus may obtain a longest edge length among edge lengths formed between a vertex and neighboring vertices of the 3D model 210. When the longest edge length is less than or equal to a threshold value, the 3D rendering apparatus may perform the first shading on the vertex. Here, an edge length between vertices indicates a distance between neighboring vertices, for example, an edge length 240 indicates a distance between the vertex 222 and the vertex 224 and an edge length 250 indicates a distance between the vertex 226 and the vertex 232.

When the threshold value is greater than edge lengths, for example, the edge length 240, an edge length 242, an edge length 244, an edge length 246, and an edge length 248, and the threshold value is less than edge lengths, for example, the edge length 250, an edge length 252, and an edge length 254, the 3D rendering apparatus may perform the first shading on the vertices 222 and 224. The 3D rendering apparatus may determine that the first shading is not suitable for the vertices 226, 228, 230, and 232, which have edge lengths greater than the threshold value. The 3D rendering apparatus may perform pixel-based second shading on the vertices 226, 228, 230, and 232, and neighboring pixels of the vertices 226, 228, 230, and 232.

A reference line 260 indicates a line to identify a pixel area where the second shading is to be performed in an image frame in which the 3D model 210 is expressed. For the vertices 222 and 224 on which the first shading is performed, the 3D rendering apparatus may determine reference information to indicate that the first shading is performed. For example, the 3D rendering apparatus may allocate a flag value of "1" to the vertices 222 and 224 on which the first shading is performed, and allocate a flag value of "0" to the vertices 226, 228, 230, and 232 on which the first shading is not performed. The flag values allocated to the vertices 222, 224, 226, 228, 230, and 232 may be interpolated, and thus the reference information may be determined for all pixels of the image frame. For example, pixels located between the vertex 224 to which the flag value of 1 is allocated and the vertex 226 to which the flag value of 0 is allocated may have, as a flag value, a median value between 0 and 1 through the interpolation. For example, the 3D rendering apparatus may perform the second shading on pixels having a flag value less than or equal to 0.5 among all the pixels of the image frame.

The 3D rendering apparatus may determine an area to which the fast first shading is to be applied and an area to which the second shading for a desirable image quality is to be applied, separately, based on geometrical characteristic information such as the edge length of the 3D model 210. Thus, the 3D rendering apparatus may render the 3D model at a higher speed while minimizing degradation of an image quality.

Figure 3:
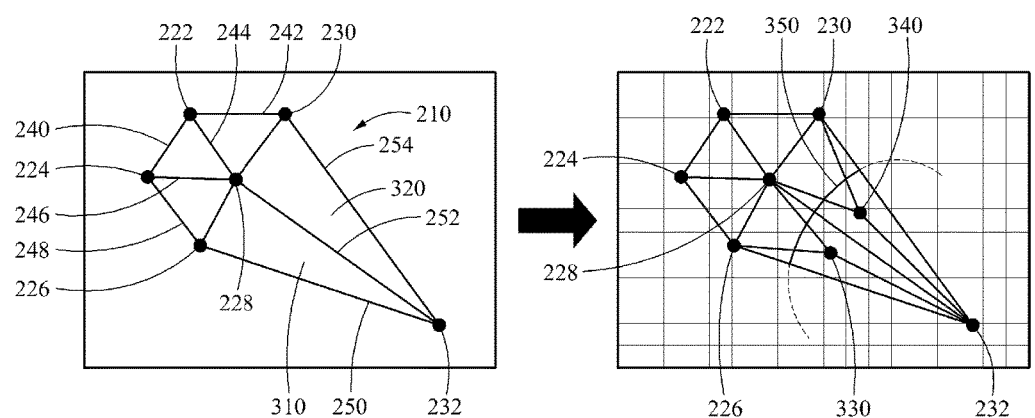
FIG. 3 is a diagram illustrating an example of a process of performing a first shading and a second shading based on a surface subdivision.

FIG. 3 illustrates an example of a process of performing a first shading and a second shading based on a surface subdivision. Referring to FIG. 3, a 3D rendering apparatus may determine that a first shading is to be applied to the vertices 222 and 224 among vertices, for example, the vertex 222, the vertex 224, a vertex 226, a vertex 228, a vertex 230, and a vertex 232, of a 3D model 210 projected to a screen space. The 3D rendering apparatus may determine whether a surface division is applicable to surfaces or polygons, for example, a surface 310 and a surface 320, of the 3D model 210 formed with the vertices 226, 228, 230, and 232. When the surface subdivision is determined to be applicable, the 3D rendering apparatus may perform the surface subdivision to restructure the 3D model 210.

A right portion of FIG. 3 illustrates a result of performing the surface subdivision on the surfaces 310 and 320 of the 3D model 210 into three areas. For example, the 3D rendering apparatus may add new vertices 330 and 340 at a centroidal location or a location in the surfaces 310 and 320 to divide the surfaces 310 and 320 into a plurality of areas. The 3D rendering apparatus may determine a vertex to which the first shading is to be applied based on the restructured 3D model. Here, when the vertices 222, 224, 226, 228, and 230 are determined to be the vertex to which the first shading is to be applied through the surface subdivision, the 3D rendering apparatus may perform the first shading on the vertices 222, 224, 226, 228, and 230. The 3D rendering apparatus may perform a pixel-unit second shading based on reference information indicating whether the first shading is performed, similarly to FIG. 2. The above descriptions of FIGS. 1-2 is also applicable to FIG. 3, and is incorporated herein by reference. Thus, the above description may not be repeated here. A reference line 350 is a line to classify a pixel area on which the second shading is to be performed. The pixel area to which the second shading is to be performed may vary depending on whether the surface subdivision is performed.

Figure 4:
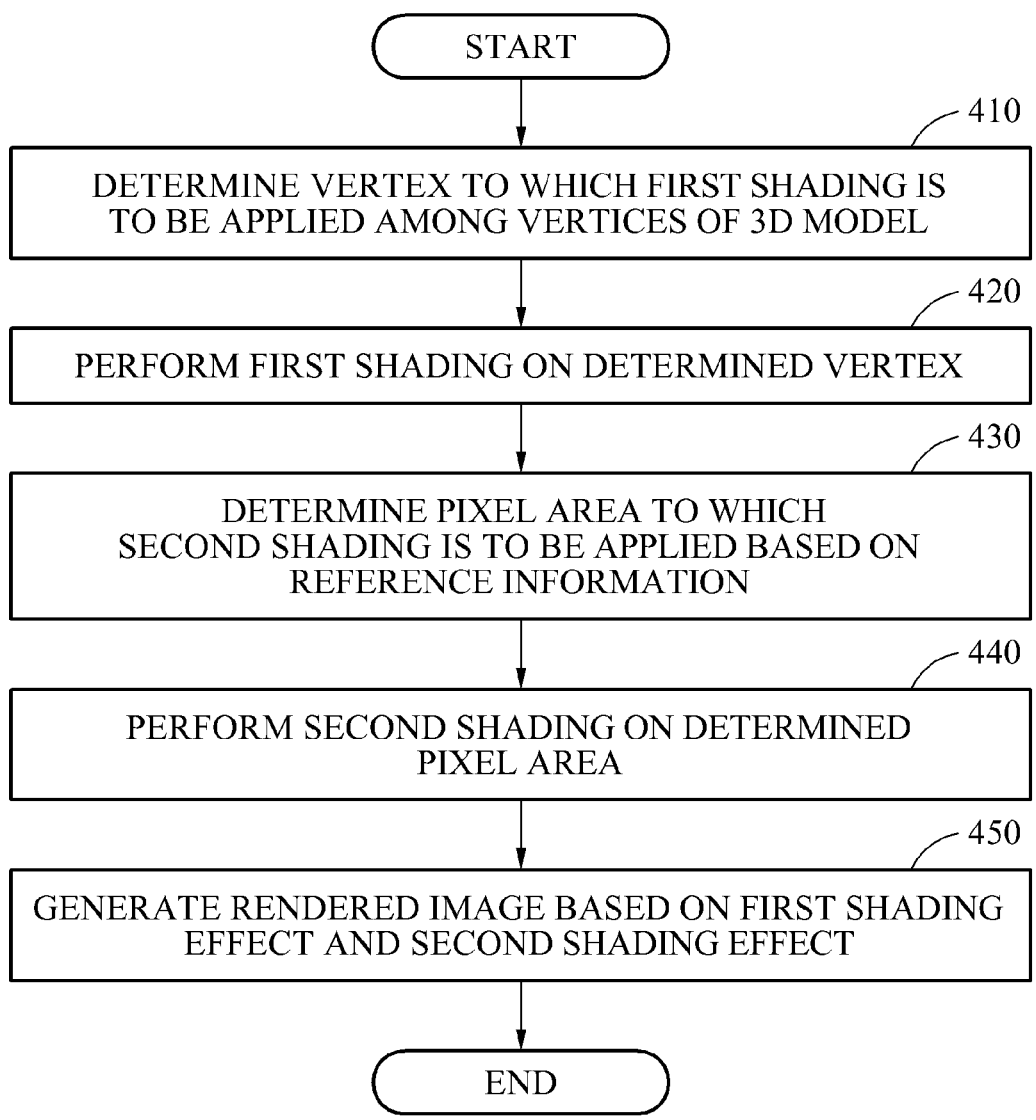
FIG. 4 is a is a diagram illustrating an example of a 3D rendering method.

FIG. 4 is a diagram illustrating an example of a 3D rendering method. The 3D rendering method may be performed by a 3D rendering apparatus including at least one processor. The operations in FIG. 4 may be performed in the sequence and manner as shown, although the order of some operations may be changed or some of the operations omitted without departing from the spirit and scope of the illustrative examples described. Many of the operations shown in FIG. 4 may be performed in parallel or concurrently. The above descriptions of FIGS. 1-3 is also applicable to FIG. 4, and is incorporated herein by reference. Thus, the above description may not be repeated here.

Referring to FIG. 4, in 410, the 3D rendering apparatus determines a vertex to which a first shading is to be applied from among vertices of a 3D model projected to a screen space. The 3D rendering apparatus determines the vertex to which the first shading is to be applied based on characteristic information of the 3D model and a rendering speed.

In 420, the 3D rendering apparatus performs the first shading on the vertex determined in 410. The 3D rendering apparatus determines a first shading effect by performing a vertex-unit shading on the determined vertex. In 430, the 3D rendering apparatus determines a pixel area to which a second shading is to be applied based on reference information indicating whether the first shading has been applied. In 440, the 3D rendering apparatus performs the second shading on the pixel area determined in 430. The 3D rendering apparatus determines a second shading effect by performing a pixel-unit shading on the determined pixel area.

In 450, the 3D rendering apparatus generates a rendered image based on the first shading effect and the second shading effect.

Figure 5:
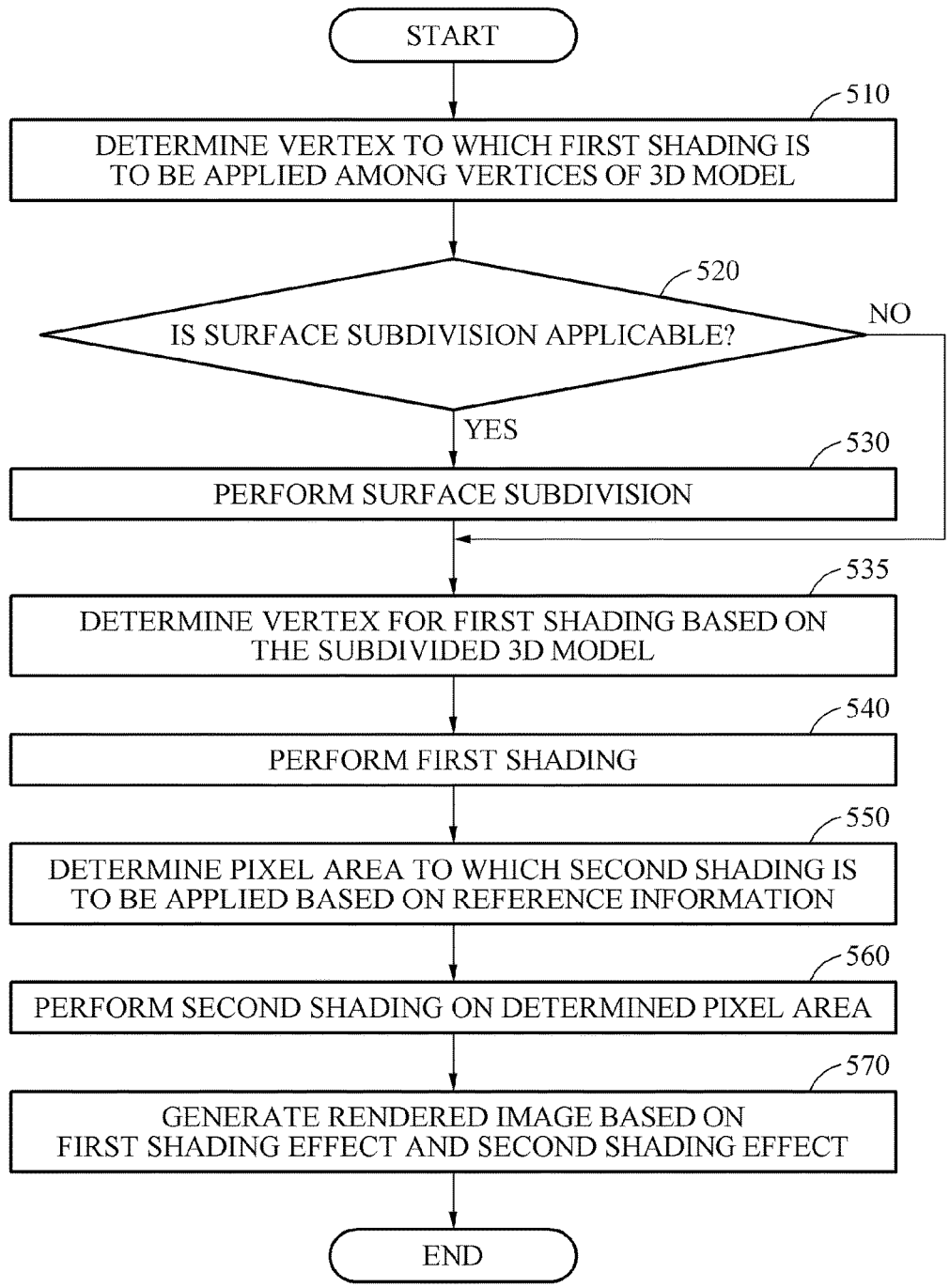
FIG. 5 is a is a diagram illustrating another example of a 3D rendering method.

FIG. 5 is a diagram illustrating another example of a 3D rendering method. The 3D rendering method may be performed by a 3D rendering apparatus including at least one processor. The operations in FIG. 5 may be performed in the sequence and manner as shown, although the order of some operations may be changed or some of the operations omitted without departing from the spirit and scope of the illustrative examples described. Many of the operations shown in FIG. 5 may be performed in parallel or concurrently. The above descriptions of FIGS. 1-4 is also applicable to FIG. 5, and is incorporated herein by reference. Thus, the above description may not be repeated here.

Referring to FIG. 5, in 510, the 3D rendering apparatus determines a vertex to which a first shading is to be applied among vertices of a 3D model projected to a screen space.

In 520, the 3D rendering apparatus determines whether a surface subdivision is applicable to the 3D model. In 530, when the surface subdivision is to be performed, the 3D rendering apparatus performs the surface subdivision on the 3D model. Through the surface subdivision, a surface of the 3D model may be divided into a plurality of areas and the 3D model may be restructured. In 535, the 3D rendering apparatus may determine the vertex to which the first shading is to be applied based on the restructured 3D model.

In 540, when the surface subdivision is determined to be inapplicable to the 3D model, the 3D rendering apparatus performs the first shading on the vertex determined in 510. In another example, in 540, the 3D rendering apparatus performs the first shading on a vertex determined based on a result of the surface subdivision performed in 530.

In 550, the 3D rendering apparatus determines a pixel area to which a second shading is to be applied based on reference information indicating whether the first shading is applied. In 560, the 3D rendering apparatus performs the second shading on the pixel area determined in 550. The 3D rendering apparatus determines a second shading effect by performing a pixel-unit shading on the determined pixel area.

In 570, the 3D rendering apparatus generates a rendered image based on the first shading effect and the second shading effect.

Figure 6:
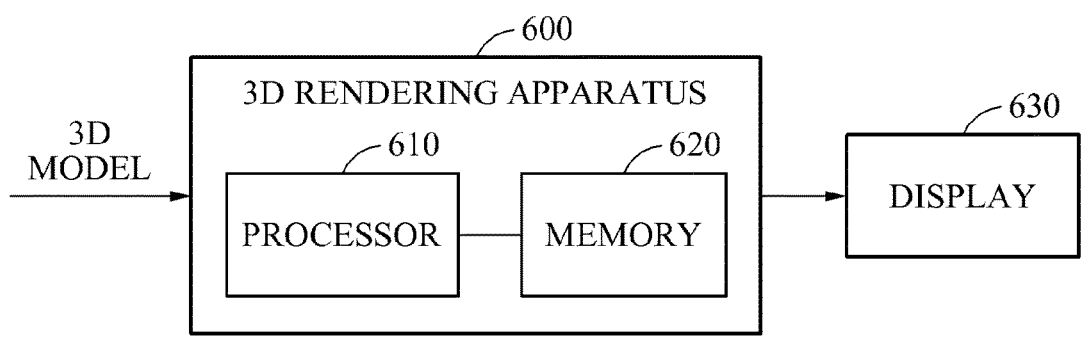
FIG. 6 is a diagram illustrating another example of a configuration of a 3D rendering apparatus.

FIG. 6 is a diagram illustrating another example of a configuration of a 3D rendering apparatus 600. A 3D model may be input to the 3D rendering apparatus 600 for 3D rendering. The 3D rendering apparatus 600 may perform the 3D rendering on the input 3D model. The 3D rendering apparatus 600 may perform at least one 3D rendering method described above. The 3D rendering apparatus 600 may output a rendered image through a display 630.

Referring to FIG. 6, the 3D rendering apparatus 600 includes a processor 610 and a memory 620. The memory 620 communicates with the processor 610, and stores instructions that may be implemented by the processor 610 or data to be computed by the processor 610. The processor 610 includes hardware to execute the instructions stored in the memory 620. The processor 610 retrieves or fetches instructions from an internal register, an internal cache, the memory 620, or a storage, and executes the retrieved or fetched instructions. The processor 610 records at least one execution result in the internal register, the internal cache, the memory 620, or the storage. The processor 610 executes instructions to perform at least one operation described with reference to FIGS. 1 through 5. In an example, the processor 610 may be a graphics processing unit (GPU). In an example, a first shading may be performed by a vertex shader, and a second shading may be performed by a pixel shader or a fragment shader.

The apparatuses, units, modules, devices, and other components illustrated in FIGS. 1 and 6 that perform the operations described herein with reference to FIGS. 4 and 5 are implemented by hardware components. Examples of hardware components include controllers, sensors, generators, drivers, and any other electronic components known to one of ordinary skill in the art. In one example, the hardware components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array (FPGA), a programmable logic array, a microprocessor, an application-specific integrated circuit (ASIC), or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 4 and 5. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A three-dimensional (3D) rendering method, using one or more graphics processors and a memory, comprising:
   determining a vertex for a first shading from among vertices of a 3D model based on characteristic information of the 3D model;
   performing the first shading on the determined vertex;
   allocating, to the vertices, flag values indicating whether the first shading is performed for the vertices;

interpolating the flag values;
determining reference information indicating whether the first shading is applied for all pixels of an image frame based on the interpolated flag values;
determining a pixel area for a second shading based on the reference information;
performing the second shading on the determined pixel area; and
generating a rendered image based on the first shading and the second shading.

2. The method of claim 1, wherein the determining of the vertex for the first shading comprises determining the vertex based on a length of an edge between a vertex and a neighboring vertex of the 3D model.

3. The method of claim 1, wherein the determining of the vertex for the first shading comprises:
determining the vertex based on an area of a polygon formed with the vertex.

4. The method of claim 1, further comprising:
dividing a surface of the 3D model into areas, in response to a determination of an applicability of a surface subdivision to the 3D model, wherein
the determining of the vertex for the first shading comprises determining the vertex based on the divided 3D model.

5. The method of claim 4, wherein the dividing of the surface of the 3D model comprises adding a vertex to the surface of the 3D model.

6. The method of claim 1, wherein the interpolating of the flag values comprises interpolating the flag values for pixels located between the vertices.

7. The method of claim 6, wherein the determining of the pixel area for the second shading comprises determining the pixel area based on the reference information and a threshold value.

8. The method of claim 1, wherein the determining of the vertex comprises:
determining the vertex to which the first shading is to be applied based on any one or any combination of any two or more of information about a vertex density of the 3D model, information about an area of a polygon formed by the vertices of the 3D model, information about a distance among vertices to be projected to a screen space, information about an area of a polygon to be projected to the screen space, and information about a distance between a vertex and a virtual light source.

9. The method of claim 1, wherein the characteristic information of the 3D model is determined based on any one or any combination of any two or more of vertex information of the 3D model, location information of a virtual camera, direction information of the virtual camera, location information of a virtual light source, and direction information of the virtual light source.

10. The method of claim 1, wherein the first shading is determined in a vertex unit of the 3D model, and the second shading is determined in a pixel unit of an image frame in which the 3D model is expressed.

11. The method of claim 1, wherein the determining of the pixel area for the second shading comprises determining the pixel area based on a speed at which rendering is performed on the 3D model and the reference information.

12. A non-transitory computer-readable medium storing instructions that, when executed by a processor, cause the processor to perform the method of claim 1.

13. The method of claim 1, wherein the performing interpolation comprises allocating a flag value of "1" to a vertex indicating that the first shading is performed;
allocating a flag value of "0" to a vertex indicating that the first shading is not performed;
interpolating flag values to pixels which flag values are not allocated; and
performing the second shading on pixels having a flag value less than a threshold value.

14. The method of claim 1, wherein a processing speed of the first shading is faster than a processing speed of the second shading.

15. The method of claim 1, further comprising:
increasing a proportion of the vertices to which the first shading is to be applied, in response to a rendering speed being less than a reference speed; and
decreasing the proportion of the vertices to which the first shading is to be applied, in response to the rendering speed being greater than the reference speed.

16. A three-dimensional (3D) rendering apparatus, comprising one or more graphics processors and a memory, comprising:
a determiner configured to determine a vertex for a first shading from among vertices of a 3D model based on characteristic information of the 3D model;
a first shader configured to
perform the first shading on the determined vertex,
allocate, to the vertices, flag values indicating whether the first shading is performed for the vertices,
interpolate the flag values, and
determine reference information indicating whether the first shading is applied for all pixels of an image frame based on the interpolated flag values;
a second shader configured to determine a pixel area to apply a second shading based on the reference information, and to perform the second shading on the determined pixel area; and
a rendered image generator configured to generate a rendered image based on the first shading and the second shading.

17. The apparatus of claim 16, wherein the first shader is further configured to allocate, to each vertex of the 3D model to be projected to a screen space, a vertex attribute value indicating whether the first shading is performed.

18. The apparatus of claim 16, wherein the determiner comprises:
a divider configured to determine whether a surface subdivision is applicable to the 3D model, and to divide a surface of the 3D model into areas in response to the applicability of the surface subdivision.

19. The apparatus of claim 16, wherein the first shading is determined in a vertex unit of the 3D model, and the second shading is determined in a pixel unit of an image frame in which the 3D model is expressed.

20. The apparatus of claim 16, wherein the determiner is further configured to determine the vertex for the first shading, in response to a distance between the vertex and the virtual light source being less than a threshold value.

21. A three-dimensional (3D) rendering apparatus, comprising one or more graphics processors and a memory, comprising:
a determiner configured to determine whether to apply a first shading or a second shading to a current image frame;
a first shader configured to
perform the first shading on the current image frame, allocate, to vertices in the current image frame, flag values indicating whether the first shading is performed for the vertices, interpolate the flag values, and determine reference information indicating whether the first shading is applied for all pixels of the current image frame based on the interpolated flag values, in response to the first shading being determined;

a second shader configured to perform the second shading on the current image frame based on the reference information, in response to the second shading being determined; and a rendered image generator configured to generate a rendered image for the current image frame based on either one or both of the first shading and the second shading.

22. The apparatus of claim 21, wherein the determiner is further configured to determine the first shading or the second shading based on either one or both of vertex information of the 3D model and a speed at which rendering is performed on the 3D model.

23. The method of claim 1, wherein the interpolating of the flag values comprises setting an flag value of a pixel, among the pixels, located between a first vertex, among the vertices, and a second vertex, among the vertices, as a value between a first flag value of the first vertex and a second flag value of the second vertex.

24. The method of claim 23, wherein the determining of the pixel area for the second shading comprises determining that the pixel area includes the pixel, in response to the flag value of the pixel being less than or equal to a threshold.

* * * * *